(12) United States Patent
Huang

(10) Patent No.: US 10,896,518 B2
(45) Date of Patent: Jan. 19, 2021

(54) IMAGE PROCESSING METHOD, IMAGE PROCESSING APPARATUS AND COMPUTER READABLE STORAGE MEDIUM

(71) Applicant: BEIJING KUANGSHI TECHNOLOGY CO., LTD., Beijing (CN)

(72) Inventor: Haibin Huang, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 187 days.

(21) Appl. No.: 16/147,174

(22) Filed: Sep. 28, 2018

(65) Prior Publication Data

US 2019/0304113 A1 Oct. 3, 2019

(30) Foreign Application Priority Data

Mar. 29, 2018 (CN) .......................... 2018 1 0274393
Mar. 30, 2018 (CN) .......................... 2018 1 0289413

(51) Int. Cl.
*G06K 9/00* (2006.01)
*G06T 7/55* (2017.01)
(Continued)

(52) U.S. Cl.
CPC ................. *G06T 7/55* (2017.01); *G06N 3/08* (2013.01); *G06T 1/20* (2013.01); *G06T 5/001* (2013.01)

(58) Field of Classification Search
CPC ........ G06N 3/08; G06N 3/0454; G06N 3/088; G06T 1/20; G06T 2207/10048;
(Continued)

(56) References Cited

U.S. PATENT DOCUMENTS

2012/0162375 A1\* 6/2012 Vlutters ............... H04N 13/218
348/46
2014/0016832 A1\* 1/2014 Kong ................... A61B 5/1128
382/115
(Continued)

FOREIGN PATENT DOCUMENTS

CN 105930710 9/2016
CN 106780589 5/2017
(Continued)

OTHER PUBLICATIONS

First Chinese Office Action, issued in the corresponding Chinese Patent Application No. 2018102894134, dated Mar. 4, 2020, 18 pages.
(Continued)

*Primary Examiner* — Tom Y Lu
(74) *Attorney, Agent, or Firm* — Hamre, Schumann, Mueller & Larson, P.C.

(57) ABSTRACT

The embodiment of the present disclosure relates to an image processing method, which includes: acquiring a first image and a second image captured for a same object; and determining depth information of the object according to the first image and the second image. The embodiment of the present disclosure further provides an image processing device and a computer readable medium.

14 Claims, 6 Drawing Sheets

(51) Int. Cl.
*G06N 3/08* (2006.01)
*G06T 1/20* (2006.01)
*G06T 5/00* (2006.01)

(58) Field of Classification Search
CPC ....... G06T 5/001; G06T 7/55; G06T 2200/32; G06T 2207/10024; G06T 2207/20084; G06T 2207/30201; G06T 3/4038; G06T 7/50
See application file for complete search history.

(56) References Cited

U.S. PATENT DOCUMENTS

| | | | | |
|---|---|---|---|---|
| 2017/0345146 | A1* | 11/2017 | Fan | G06K 9/00228 |
| 2018/0211401 | A1* | 7/2018 | Lee | G06T 7/593 |
| 2019/0034702 | A1* | 1/2019 | Hong | G06K 9/00255 |
| 2019/0303715 | A1* | 10/2019 | Jiang | G06N 3/0481 |
| 2019/0385325 | A1* | 12/2019 | Kweon | G06T 3/4007 |

FOREIGN PATENT DOCUMENTS

| | | |
|---|---|---|
| CN | 106981080 | 7/2017 |
| CN | 107506714 | 12/2017 |
| CN | 107578436 | 1/2018 |
| CN | 107590830 | 1/2018 |

OTHER PUBLICATIONS

Xiaojing Gu, "Research on Natural Color Night Vision Imaging Method Based on Image Analysis", China Doctoral Dissertations Full-text Database, Issue 6, Jun. 15, 2012, 7 pages.

Xu et al., "Hign Resolution Remote Sensing Image Classification Combining with Mean-Shift Segmentation and Fully Convolution Neural Network", Laser& Optoelectronics Progress, Issue 2, Feb. 28, 2018, 9 pages.

Second Chinese Office Action, issued in the corresponding Chinese Patent Application No. 201810289413.4, dated Sep. 28, 2020, 26 pages.

* cited by examiner

IMAGE PROCESSING METHOD, IMAGE PROCESSING APPARATUS AND COMPUTER READABLE STORAGE MEDIUM

TECHNICAL FIELD

Embodiments of the present disclosure relate to an image processing method, an image processing device and a computer readable storage medium.

BACKGROUND

In stereo vision, people can obtain the depth information of the scene by shooting from different angles with multiple cameras. The depth information of the scene has an important influence on three-dimensional (3D) reconstruction, fine segmentation, light effect rendering, face animation and other applications. The traditional proposal generally generate a depth map based on stereo matching algorithm through dual-color cameras, but for mobile devices such as mobile phones, dual-color camera modules have large volume and are very expensive.

SUMMARY

In the first aspect, an image processing method is provided in the embodiments of this disclosure, the method comprises: acquiring a first image and a second image captured for a same object; and determining depth information of the object in the first image or the second image according to the first image and the second image.

In some embodiments, determining the depth information of the object in the first image or the second image according to the first image and the second image comprises: obtaining the depth information by inputting the first image and the second image into a trained neutral network.

In some embodiments, the neutral network includes a convolution network and a deconvolution network; and obtaining the depth information by inputting the first image and the second image into the trained neutral network comprises: inputting the first image and the second image into the convolution network, taking an output of the convolution network as an input of the deconvolution network, outputting a depth map by processing of the deconvolution network, and determining the depth information based on the depth map.

In some embodiments, inputting the first image and the second image into the convolution network comprises: inputting a spliced image into the convolution network, wherein the spliced image is formed by splicing the first image and the second image on the channels.

In some embodiments, the convolution network includes n convolution layers; the deconvolution network includes n deconvolution layers; a feature map outputted by a $i^{th}$ convolution layer in the convolution network and a feature map outputted by a $(n-i)^{th}$ deconvolution layer in the deconvolution network are spliced on the channels; the spliced feature map is taken as an input of a $(n-i+1)^{th}$ deconvolution layer among the n deconvolution layers; and i is an integer greater than or equal to 1 and less than or equal to n-1.

In some embodiments, the convolution network includes a first sub-convolution network and a second sub-convolution network; and inputting the first image and the second image into the convolution layer and taking the output of the convolution network as the input of the deconvolution network includes: obtaining a first feature map by inputting the first image into the first sub-convolution network; obtaining a second feature map by inputting the second image into the second sub-convolution network; and taking the spliced feature map as the input of the deconvolution network, wherein the spliced feature is generated by splicing the first feature map and the second feature map on the channels.

In some embodiments, the first sub-convolution network includes n convolution layers; the second sub-convolution network includes n convolution layers; the deconvolution network includes n deconvolution layers; a feature map outputted by the $i^{th}$ convolution layer of the first sub-convolution network and/or the second sub-convolution network and a feature map outputted by a $(n-i)^{th}$ deconvolution layer in the n deconvolution layers are spliced on the channels to generated a spliced feature map, the spliced feature map is taken as an input of a $(n-i+1)^{th}$ deconvolution layer in the n deconvolution layers; and i is an integer greater than or equal to 1 and less than or equal to n-1.

In some embodiments, the method further comprises processing the first image or the second image according to the depth information.

In some embodiments, processing the first image or the second image according to the depth information includes: reconstructing a three-dimensional (3D) model of the object in the first image or the second image.

In some embodiments, the object is a photographing spot, a human face or a human head.

In some embodiments, processing the first image or the second image according to the depth information includes: changing light effect of the first image or the second image according to the depth information.

In some embodiments, processing the first image or the second image according to the depth information includes: beautifying the object in the first image or the second image according to the depth information.

In some embodiments, processing the first image or the second image according to the depth information includes: blurring the first image or the second image according to the depth information.

In some embodiments, processing the first image or the second image according to the depth information includes: determining whether the object is a living body according to the depth information.

In some embodiments, before acquiring the first image and the second image captured for the same object, the method further comprises: respectively obtaining the first image and the second image by preprocessing an image captured by an infrared camera and an image captured by a visible light camera.

In some embodiments, the first image is an infrared image; and the second image is a black and white image, a grayscale image or a color image.

In the second aspect, an image processing device is provided in the embodiments of this disclosure, the image processing device is used to achieve the image processing method above. Correspondingly, the image processing device includes modules or units used to perform every steps above. For example, the image processing device includes an acquiring unit and a processing unit.

In some embodiments, the image processing device further comprises an infrared camera and a visible light camera, the acquiring unit is used to acquire a first image from the infrared camera, and acquire a second image from the visible light camera.

In the third aspect, an image processing device is provided in the embodiments of this disclosure, it comprises: a memory configured to store computer readable instructions;

and a processor configured to run the computer readable instructions to enable the image processing device perform: acquiring a first image and a second image captured for a same object; and determining depth information of the object in the first image or the second image according to the first image and the second image.

In some embodiments, the image processing device further comprises: an infrared camera and a visible light camera, wherein the processor is also configured to run the computer readable instructions to enable the image processing device further perform: controlling the infrared camera and the visible light camera to capture images of the same object.

In some embodiments, the image processing device further comprises: a device sensor configured to detect the state of the image processing device.

In the first aspect, a computer readable storage medium is provided in the embodiments of this disclosure, the medium is used for storing computer readable instructions, when the computer readable instructions are executed by the computer, the computer performs: acquiring a first image and a second image captured for a same object; and determining depth information of the object in the first image or the second image according to the first image and the second image.

BRIEF DESCRIPTION OF THE DRAWINGS

In order to make the embodiments of the disclosure apparent, the drawings related to the embodiments of the disclosure will be described briefly. Apparently, the described embodiments are just a part of the embodiments of the disclosure. For those skilled in the art, he or she can obtain other figure(s) according to these figures, without any inventive work.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In the embodiment of the present disclosure, the image processing device may be an independent terminal and may also be a processing module mounted in the terminal, wherein the terminal includes but not limited to a mobile phone, a tablet PC, a smart watch, a wearable device, an entrance guard control device, a gate, a self-service camera, a computer, etc.

The image processing method and the image processing device, provided by the embodiment of the present disclosure, can determine the depth information of the photographing spot by adoption of images captured for the same object by the visible light camera and the infrared camera, and not only can reduce the cost but also can reduce the device volume.

It should be noted that in the embodiment of the present disclosure, h×w×n is used to represent the size and the channels of an image or a feature map, in which h refers to the height of the image; w refers to the width of the image; and n refers to the channels of the image. The size of the image or the feature map described below refers to h×w.

Figure 1:
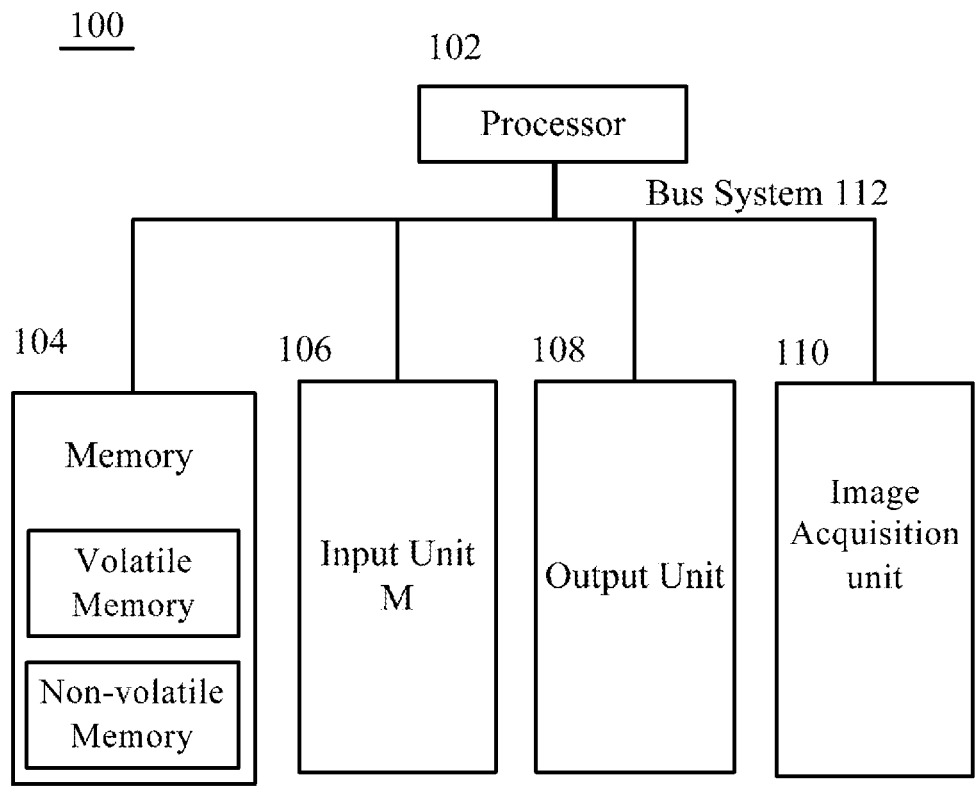
FIG. 1 is a schematic block diagram of an image processing device provided by one embodiment of the present disclosure.

Firstly, description is given to the implementation of an image processing device 100 provided by the embodiment of the present disclosure with reference to FIG. 1.

As shown in FIG. 1, the image processing device 100 may comprise one or more processors 102 and one or more memories 104. Optionally, the image processing device 100 may further comprise an image acquisition unit 110. Optionally, the image processing device 100 may further comprise an input unit 106 and an output unit 108.

These components are connected with each other through a bus system 112 and/or connecting mechanisms of other forms (not shown). It should be noted that the components and the structures of the image processing device 100 as shown in FIG. 1 are only illustrative and not limitative. The terminal may also include other components and structures as needed.

The processor 102 may be a central processing unit (CPU), a graphics processing unit (GPU) or a processing unit of other forms having data processing capability and/or instruction execution capability, and can control other components in the image processing device 100 to execute desired functions.

The memory 104 may include one or more computer program products. The computer program products may include a variety of forms of computer readable storage media, e.g., volatile memories and/or non-volatile memories. The volatile memory, for instance, may include a random access memory (RAM) and/or a cache. The non-volatile memory, for instance, may include a read-only memory (ROM), a hard disk, a flash memory, etc. One or more computer program instructions may be stored on the computer readable storage medium. The processor 102 may run the program instructions, so as to realize the image processing function as described below in the embodiment of the present disclosure (implemented by the processor) and/or other desired functions. A variety of applications and a variety of data, e.g., a variety of data used and/or produced by the applications, may also be stored in the computer readable storage medium.

The input unit 106 may be a device that is used by a user to input instructions, and may include one or more selected from a keyboard, a mouse, a microphone and a touch panel.

The output unit 108 may output various kinds of information (e.g., image or sound) to the outside (for instance, the user), and may include one or more of a display, a loudspeaker, etc.

The image acquisition unit 110 can capture images (including video frames), and store the captured images into the memory 104 for the use of other components. It should be understood that the image acquisition unit 110 is only illustrative, and the image processing device 100 may not comprise the image acquisition unit 110. In this case, other image acquisition units can be utilized to acquire images and send the acquired images to the image processing device 100. Or the image processing device 100 may also directly acquire one or more image frames stored in the memory thereof for processing. The image acquisition unit here may include an infrared camera and a visible light camera, in which the visible light camera can capture color images, grayscale images or black and white images.

Optionally, the image processing device 100 may further comprise a device sensor. The device sensor may be any suitable sensor capable of detecting the state (e.g., speed and illumination) of the image processing device 100, such as a gyroscope or an accelerometer. The device sensor may store sensor data acquired by the device sensor into the memory 104 for the use of other components.

Figure 2:
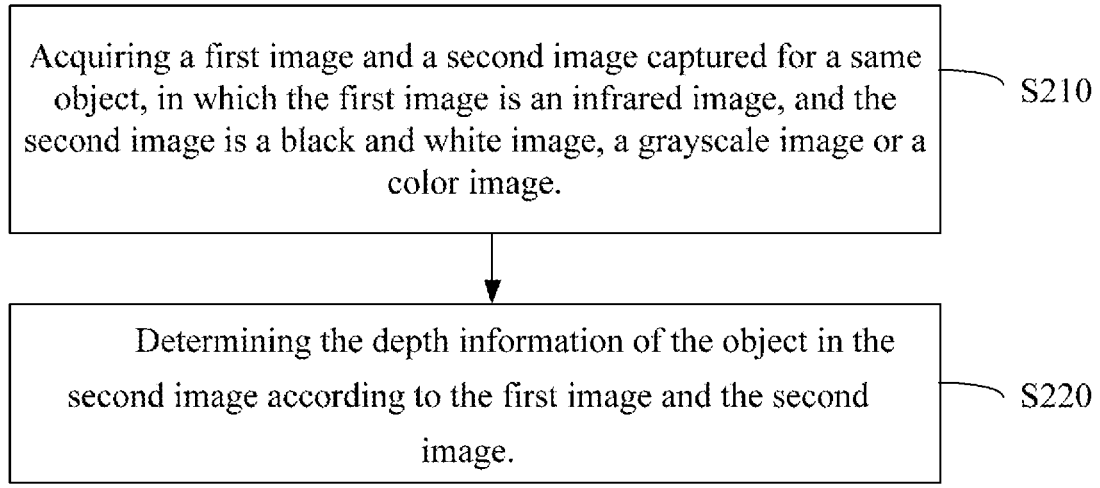
FIG. 2 is a schematic flowchart of an image processing method provided by one embodiment of the present disclosure.

FIG. 2 is a schematic flowchart of an image processing method provided by the embodiment of the present disclosure. As shown in FIG. 2, the image processing method comprises the following step:

S210: acquiring a first image and a second image captured for a same object.

For instance, the first image is an infrared image, and the second image is a black and white image, a grayscale image or a color image. Of course, the first image and the second image may also be images of other types captured for the same object.

Wherein, the object may be a photographing spot, may also be a specific human being or object (such as an animal, a vehicle, a building, etc.), may also be a specific part (e.g., the human head, the human face, the vehicle head or the animal head) of the human being or the object, and may also be a photographing spot including the human being or the object.

For instance, the first image is captured by the infrared camera, and the second image is captured by the visible light camera. Illustratively, the first image and the second image may be simultaneously captured. Illustratively, the first image and the second image are respectively captured at the first moment and the second moment, and the duration between the first moment and the second moment does not exceed a preset duration threshold. Thus, the images captured for the same object by the two cameras can be consistent and will not have obvious change.

In some embodiments, before the step S210, the method as shown in FIG. 2 further comprises: obtaining the first image and the second image by preprocessing an image captured by the infrared camera and an image captured by the visible light camera. For instance, preprocessing includes size normalization and alignment, and may also include denoising, etc. The preprocessing of the image in advance can improve the accuracy of the subsequently obtained depth information. Illustratively, if the object is the human face, face detection may also be performed on the image captured by the infrared camera and the image captured by the visible light camera, and then an area provided with the human face is cropped and taken as the first image and the second image.

S220: determining the depth information of the object in the first image or the second image according to the first image and the second image.

Relatively accurate depth information can be determined according to the image captured by the infrared camera and the image captured by the visible light camera. Moreover, the proposal in the embodiment of the present disclosure does not need to mount a binocular camera module, and not only can reduce the cost but also can reduce the device volume.

In addition, the embodiment of the present disclosure can provide relatively accurate depth estimation by utilization of the simple depth information of the infrared image and the specific position information of the image captured by the visible light camera, and has stronger robustness compared with the proposal of determining the depth information by adoption of single-frame images.

In some embodiments, a trained neutral network may be adopted to analyze the first image and the second image, so as to obtain the depth information of the second image. Of course, it should be understood by those skilled in the art that the depth information of the first image can also be obtained by the analysis of the first image and the second image via the trained neutral network. That is to say, in the step S220, the first image and the second image are inputted into the trained neutral network to obtain the depth information. For instance, a training sample may be adopted in advance to train the neutral network, so as to minimize the value of the loss function of the neural network and get a trained neural network.

Illustratively, the neutral network may include a convolution network and a deconvolution network. The convolution network may include a plurality of convolution layers, and the deconvolution network may include a plurality of deconvolution layers, wherein the number of the convolution layers and the deconvolution layers is relevant to the size of the image inputted into the convolution layer, may be determined according to specific conditions, and is not limited here in the embodiment of the present disclosure. Illustratively, the number of the convolution layers is the same with the number of the deconvolution layers, so that the size of the depth map outputted by the neutral network can be the same with the size of the second image. Correspondingly, the step of obtaining the depth information by inputting the first image and the second image into the trained neutral network includes: inputting the first image and the second image into the convolution network, taking the output of the convolution network as the input of the deconvolution network, and outputting the depth map after the processing of the deconvolution network, in which the depth map is used for representing the depth information; and extracting multiple-dimensioned information of the first image and the second image by analyzing the first image and the second image via the convolution network in the neutral network, and realizing depth estimation by adoption of the deconvolution network. Specifically, the depth map contains the depth information of each pixel on the first image or the second image captured for the photographed object, and the depth information of the photographed object can be obtained in accordance with the depth map. For instance, the pixel value of each pixel on the depth map is used for representing the depth information of corresponding pixel on the first image or the second image.

Figure 3:
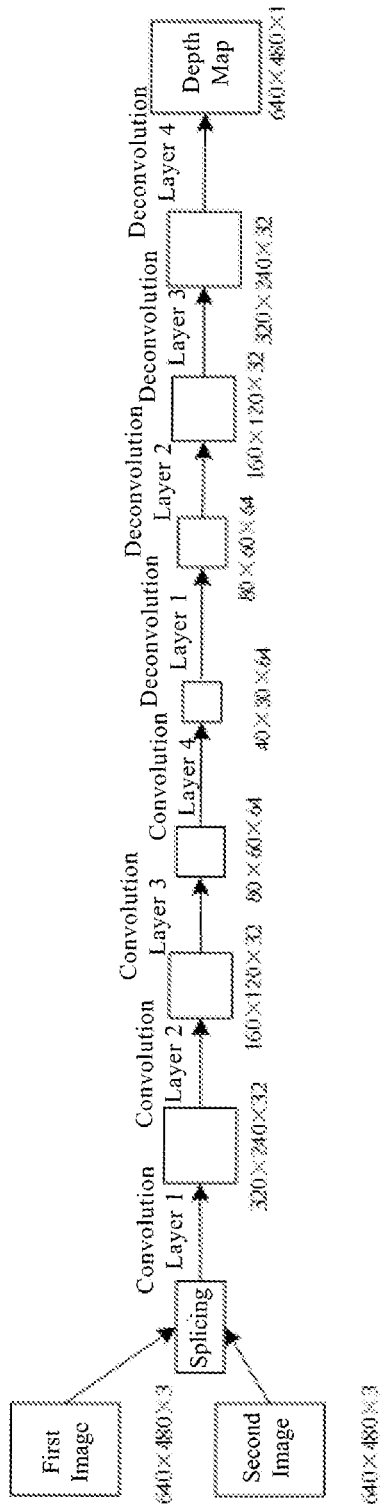
FIG. 3 is a schematic flowchart of an image processing method provided by another embodiment of the present disclosure.

In some embodiments, the first image and the second image are spliced on the channels and then inputted into the convolution network. Optionally, the first image and the second image have same size. As shown in FIG. 3, a first image (640×480×3) and a second image (640×480×3) are spliced on the channels and then inputted into the convolution network. It should be understood that the size of a new feature map obtained after the splicing of the two images on the channels is unchanged, but the number of channels of the new feature map is the sum of both. For instance, an image 640×480×6 is obtained after the splicing of the 640×480×3 image and the 640×480×3 image on the channels.

Figure 4:
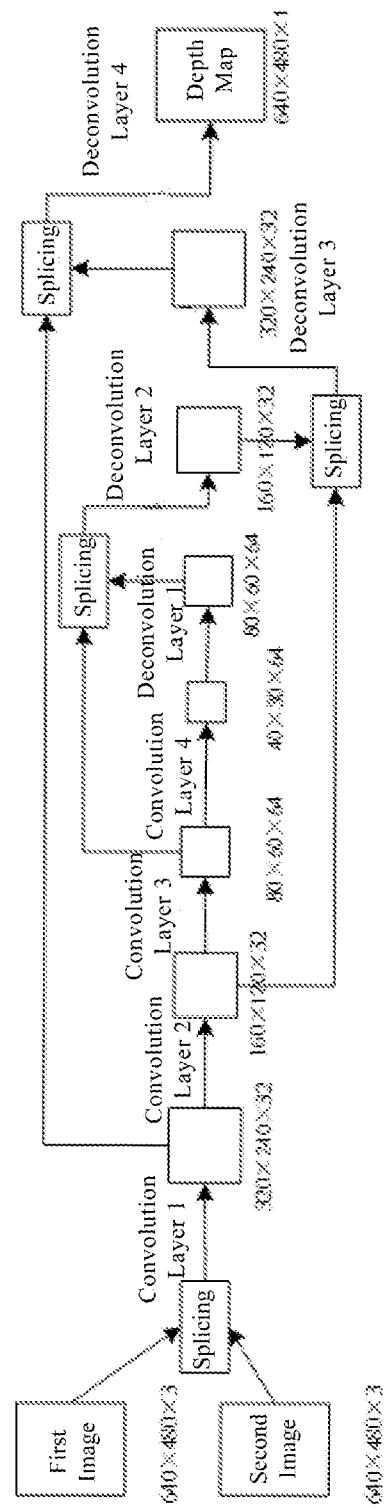
FIG. 4 is a schematic flowchart of an image processing method provided by another embodiment of the present disclosure.

Optionally, feature maps with corresponding size, outputted by the convolution layers in the convolution network, may also be added in the deconvolution network processing process, so as to further increase the details of the depth map and improve the accuracy of the depth information. Illustratively, the convolution network includes n convolution layers, and the deconvolution network includes n deconvolution layers; a feature map outputted by the $i^{th}$ convolution layer in the convolution network and a feature map outputted by the $(n-i)^{th}$ deconvolution layer in the deconvolution network are spliced on the channels; the spliced feature map is taken as the input of the $(n-i+1)^{th}$ deconvolution layer in the n deconvolution layers; an i is an integer greater than or equal to 1 and less than or equal to n−1. Wherein, the feature map outputted by the $i^{th}$ convolution layer and the feature map outputted by the $(n-i)^{th}$ deconvolution layer have same size. For instance, if n=4, as shown in FIG. 4, a feature map (320×240×32) outputted by the $1^{st}$ convolution layer and a feature map (320×240×32) outputted by the 3rd deconvolution layer in the deconvolution network, as shown in FIG. 3, may be spliced on the channels and then taken as the input of the $4^{th}$ deconvolution layer; a feature map outputted by the 2nd convolution layer and a feature map outputted by the $2^{nd}$ deconvolution layer are spliced on the channels and then taken as the input of the $3^{rd}$ deconvolution layer; . . . No further description will be given here.

In some embodiments, the convolution network includes a first sub-convolution network and a second sub-convolution network. Correspondingly, the step of inputting the first image and the second image into the convolution layer and taking the output of the convolution network as the input of the deconvolution network includes:

obtaining a first feature map by inputting the first image into the first sub-convolution network;

obtaining a second feature map by inputting the second image into the second sub-convolution network; and taking the spliced feature map as the input of the deconvolution network after splicing the first feature map and the second feature map on the channels, in which the first feature map and the second feature map have same size.

Figure 5:
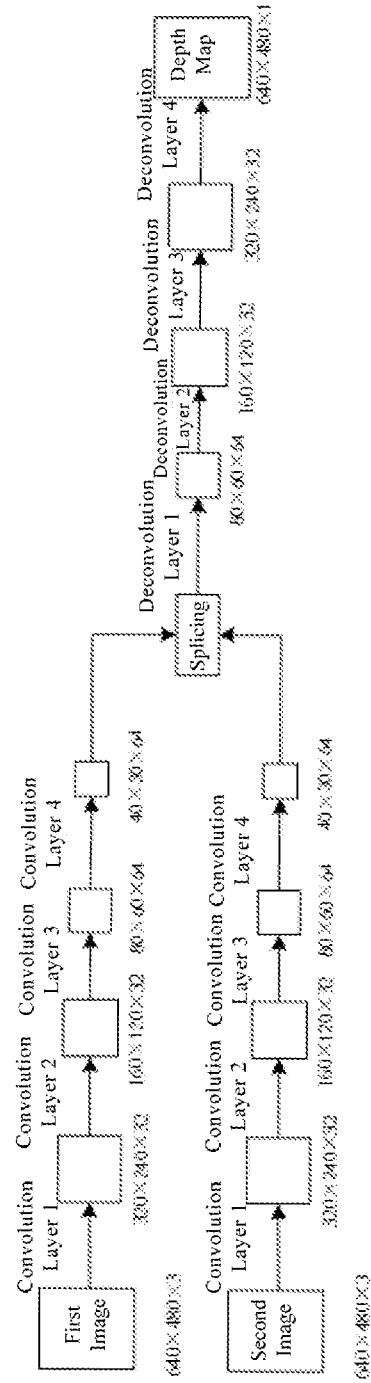
FIG. 5 is a schematic flowchart of an image processing method provided by another embodiment of the present disclosure.

As shown in FIG. 5, a first image (640×480×3) is inputted into the first sub-convolution network; a second image (640×480×3) is inputted into the second sub-convolution network; and a feature map (40×30×64) outputted by the first sub-convolution network and a feature map (40×30×64) outputted by the second sub-convolution network are spliced on the channels and then inputted into the deconvolution network.

Optionally, the feature maps with corresponding size, outputted by the convolution layers in the convolution network, may also be added in the deconvolution network processing process, so as to further increase the details of the depth map and improve the accuracy of the depth information. For instance, only the feature maps with corresponding size, outputted by the convolution layers of the first sub-convolution network, may be added during deconvolution network processing; or only the feature maps with corresponding size, outputted by the convolution layers of the second sub-convolution network, may be added; or the feature maps with corresponding size, outputted by the two sub-convolution networks, may also be simultaneously added. Illustratively, the first sub-convolution network includes n convolution layers; the second sub-convolution network includes n convolution layers; the deconvolution network includes n deconvolution layers; a feature map outputted by the $i^{th}$ convolution layer of the first sub-convolution network and/or the second sub-convolution network and a feature map outputted by the $(n-i)^{th}$ deconvolution layer in the n deconvolution layers are spliced on the channels; the spliced feature map is taken as the input of the $(n-i+1)^{th}$ deconvolution layer in the n deconvolution layers; and i is an integer greater than or equal to 1 and less than or equal to n−1. Wherein, the feature map outputted by the $i^{th}$ convolution layer and the feature map outputted by the $(n-i)^{th}$ deconvolution layer have same size.

Figure 6:
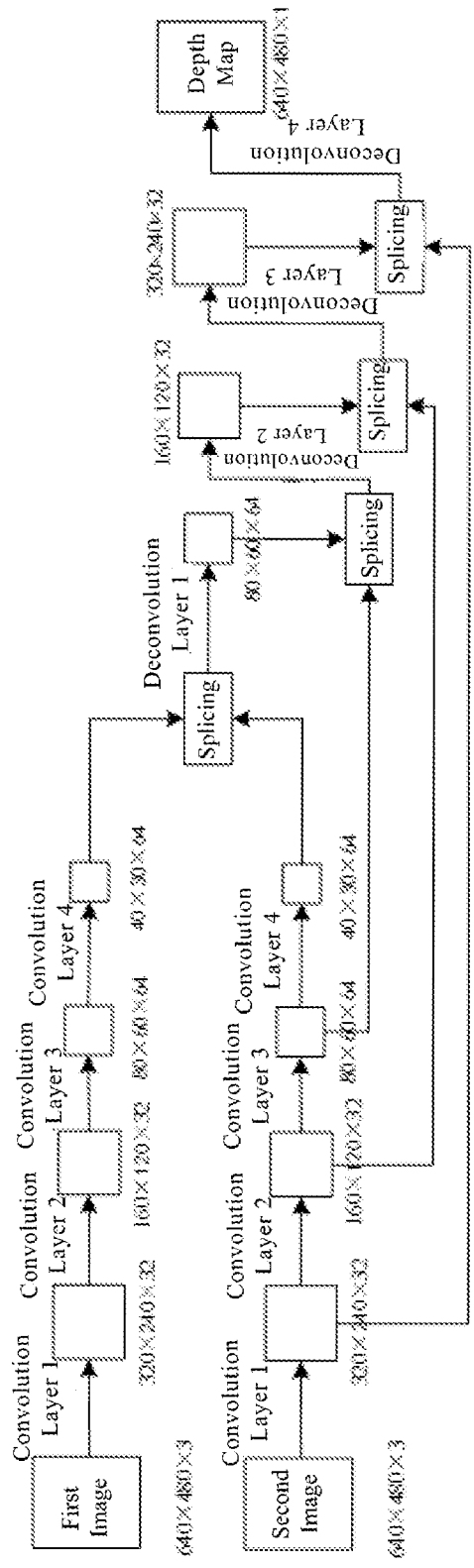
FIG. 6 is a schematic flowchart of an image processing method provided by another embodiment of the present disclosure.

For instance, if n=4, as shown in FIG. 6, a feature map (320×240×32) outputted by the $1^{st}$ convolution layer of the first sub-convolution network and a feature map (320×240×32) outputted by the $3^{rd}$ deconvolution layer in the deconvolution network are spliced on the channels and then taken as the input of the $4^{th}$ deconvolution layer; or a feature map outputted by the $2^{nd}$ convolution layer of the first sub-convolution network and a feature map outputted by the $2^{nd}$ deconvolution layer may also be spliced on the channels and then taken as the input of the $3^{rd}$ deconvolution layer. As described above, a feature map with corresponding size outputted by the second sub-convolution network and a feature map with corresponding size in the deconvolution network may also be spliced on the channels and then taken as the input of the next deconvolution layer. No further description will be given here.

In some embodiments, the depth information of the first image or the second image may also be obtained by analysis of the first image and the second image via other means. No limitation will be given here in the embodiment of the present disclosure.

In some embodiments, the method as shown in FIG. 2 may further comprise: obtaining an image with specific effect by processing the first image and/or the second image according the depth information, or reconstructing a 3D model of the photographed object, for instance, reconstructing a 3D model of an object (e.g., reconstructing a 3D model of the scene, or reconstructing a 3D model of the human face or the human head), changing the light effect of the first image and/or the second image, beautifying the first image and/or the second image, or blurring the first image and/or the second image.

In some embodiments, the photographed object is the human face. Correspondingly, the method as shown in FIG. 2 may further comprise: determining whether the photographed object in the first image and/or the second image is a living object according to the depth information, so as to prevent attackers from using photos for live attacks.

It should be understood that description is given in FIGS. 3-6 by taking the case that the neutral network includes 4 convolution layers and 4 deconvolution layers as an example, but no limitation will be given here in the embodiment of the present disclosure. The neutral network in the embodiment of the present disclosure may also include convolution layers and deconvolution layers of other numbers, for instance, may include 5 convolution layers and 5 deconvolution layers.

Description is given above to the image processing method provided by the embodiment of the present disclosure with reference to FIGS. 2-6. Description will be given below to the image processing device provided by the embodiment of the present disclosure with reference to FIG. 7.

Figure 7:
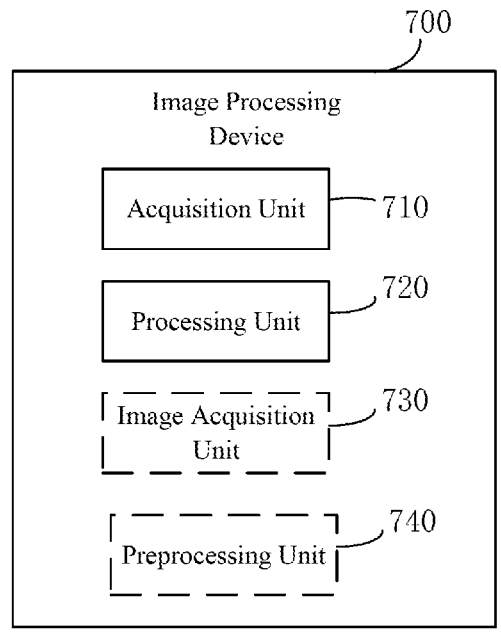
FIG. 7 is a schematic flowchart of an image processing device provided by another embodiment of the present disclosure.

FIG. 7 is a schematic block diagram of an image processing device 700 provided by the embodiment of the present disclosure. As shown in FIG. 7, the image processing device 700 comprises an acquisition unit 710 and a processing unit 720.

The acquisition unit 710 is configured to acquire a first image and a second image captured for the same object. The first image is an infrared image, and the second image is a black and white image, a grayscale image or a color image. The processing unit 720 is configured to determine depth information of the object in the first image or the second image according to the first image and the second image acquired by the acquisition unit.

Optionally, the image processing device 700 may further comprise an image acquisition unit 730, for instance, an infrared camera and a visible light camera. The infrared camera captures the first image, and the visible light camera captures the second image. The first image is, for instance, an infrared image, and the second image is, for instance, a black and white image, a grayscale image or a color image.

The image processing device provided by the embodiment of the present disclosure can determine relatively accurate depth information according to the image acquired by the infrared camera and the image acquired by the visible light camera. Moreover, the proposal in the embodiment of the present disclosure does not need to mount a binocular camera module, and not only can reduce the cost but also can reduce the device volume.

Optionally, the image processing device 700 may further comprise a preprocessing unit 740. The preprocessing unit is configured to obtain the first image and the second image by preprocessing the images captured for the same object by the infrared camera and the visible light camera. The preprocessing unit 740, for instance, is a filter and is used for the denoising of the first image and the second image. The preprocessing unit 740 may also be an image cropping unit which is used for the cropping, alignment and the like of the first image and the second image.

It should be understood that the image processing device 700 as shown in FIG. 7 corresponds to the image processing method as shown in FIG. 2, and the units or modules in the image processing device 700 are configured to execute corresponding flows in the image processing method as shown in FIG. 2. To avoid repetition, partial content is omitted here. For details, please refer to the image processing method described above.

It should be noted that the acquisition unit, the processing unit and the preprocessing unit in the image processing device 700 as shown in FIG. 7 may also be implemented by the processor 102 in the image processing device 100 as shown in FIG. 1. No further description will be given here.

Figure 8:
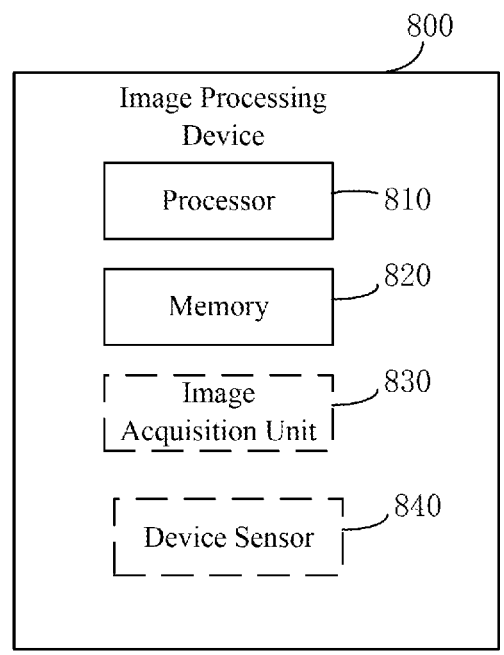
FIG. 8 is a schematic block diagram of the image processing device provided by another embodiment of the present disclosure.

FIG. 8 is a schematic block diagram of an image processing device 800 provided by another embodiment of the present disclosure. The image processing device 800 comprises a processor 810 and a memory 820.

The memory 820 stores computer readable instructions for implementing corresponding steps in the image processing method provided by the embodiment of the present disclosure. The processor 820 is configured to run the computer readable instructions, so that the image processing device can execute corresponding steps in the image processing method provided by the embodiment of the present disclosure.

Optionally, the image processing device may further comprise an image acquisition unit 830, for instance, an infrared camera and a visible light camera. The processor 810 is also configured to control the infrared camera and the visible light camera to capture images of the same object.

Optionally, the processor 810 is also configured to obtain the first image and the second image by preprocessing the images captured by the infrared camera and the visible light camera.

For instance, the image processing device 800 may further comprise a device sensor 840. The device sensor 840 may be any suitable sensor capable of detecting the state (e.g., speed and illumination) of the image processing device 800, such as a gyroscope or an accelerometer. The device sensor 840 may store sensor data acquired by the device sensor into the memory 820 for the use of other components.

It should be understood that the image processing device 800 as shown in FIG. 8 corresponds to the image processing method as shown in FIG. 2. To avoid repetition, partial content is omitted here. For details, please refer to the image processing method described above.

The embodiment of the present disclosure further provides a computer readable storage medium. Program instructions are stored on the storage medium. When the program instructions are run by a computer or a processor, corresponding steps of the image processing method provided by the embodiment of the present disclosure are executed, and corresponding modules in the image processing device provided by the embodiment of the present disclosure are implemented. The storage medium, for instance, may include a memory card for smart phone, a storage unit for tablet, a hard disk for personal computer, a read only memory (ROM), a random access memory (RAM), an erasable programmable read only memory (EPROM), a portable compact disk read only memory (CD-ROM), a USB memory, or any combination of the above storage media. The computer readable storage medium may be any combination of one or more computer readable storage media. In one embodiment, the storage medium includes a non-transitory computer readable storage medium.

The embodiment of the present disclosure provides a computer program. The computer program may be stored on the cloud or the local storage medium. When the computer program is run by a computer or a processor, corresponding step of the image processing method provided by the embodiment of the present disclosure is executed, and corresponding module in the image processing device provided by the embodiment of the present disclosure is implemented.

Although the preferred embodiments have been described here with reference to the accompanying drawings, it should be understood that the foregoing preferred embodiments are only illustrative and not intended to limit the scope of the present disclosure. Various changes and modifications may be made therein by those skilled in the art without departing from the scope and the spirit of the present disclosure. All the changes and modifications shall fall within the scope of the present disclosure defined by the appended claims.

It should be appreciated by those skilled in the art that the units in the examples described with reference to the embodiments of the present disclosure can be implemented in electronic hardware or a combination of computer software and electronic hardware. Whether these functions are executed by hardware or software depends on the specific application and the design constraints of the technical proposal. The described function may be implemented by those skilled in the art by adoption of different methods for each specific application, but the implementation shall not be considered beyond the scope of the present disclosure.

In the several embodiments provided by the present application, it should be understood that the disclosed device and method can be implemented in other manners. For example, the device embodiments described above are merely illustrative. For example, the division of the unit is only a logical function division. In actual implementation, there may be another division manner. For example, multiple units or components can be combined or integrated into another device, or some characteristics can be ignored or not executed.

In the description provided herein, numerous specific details are set forth. However, it should be understood that the embodiments of the present disclosure can be practiced without these specific details. In some examples, well-known methods, structures and technologies are not shown in detail so as not to obscure the understanding of the description.

Similarly, it should be understood that: in order to simplify the present disclosure and to assist in understanding one or more of the disclosure aspects, the characteristics of the present disclosure are sometimes grouped together into a single embodiment, figure or description thereof in the description of the exemplary embodiments of the present disclosure. However, the method provided by the present disclosure should not be construed as reflecting the following intention: the claimed to be protected disclosure requires more characteristics than those explicitly recited in each claim. More precisely, as reflected by the appended claims, the technical problems can be solved with fewer characteristics than all of the characteristics of a single disclosed embodiment. Thus, the claims following the Detailed Description are hereby explicitly incorporated into the Detailed Description, wherein each claim is a separate embodiment of the present disclosure.

It should be understood by those skilled in the art that all the characteristics disclosed in the description (including the accompanying claims, abstract and drawings) and all the processes or units of all the methods or devices so disclosed may be employed in any combination, unless the characteristics are mutually exclusive. Unless stated otherwise, each characteristic disclosed in the description (including the accompanying claims, abstract and drawings) may be replaced by an alternative characteristic that provides the same, equivalent or similar purpose.

In addition, it shall be understood by those skilled in the art that although some embodiments described herein include certain characteristics that are included in other embodiments and not other characteristics, combinations of the characteristics of different embodiments are intended to be within the scope of the present disclosure and form different embodiments. For example, in the claims, any one of the claimed embodiments can be used in any combination.

It should be noted that the above embodiments are illustrative of the present disclosure and are not intended to limit the present disclosure, and alternative embodiments can be designed by those skilled in the art without departing from the scope of the appended claims. In the claims, any reference mark placed between parentheses shall not be construed as a limitation of the claims. The word "comprise" does not exclude the presence of elements or steps that are not recited in the claims. The word "a" or "an" disposed before the element does not exclude the existence of multiple such elements. The present disclosure can be implemented by hardware comprising several different elements, and by a suitably programmed computer. In the unit claims enumerating several units, some of these units can be embodied by the same hardware item. The use of the words first, second and third does not indicate any order. These words can be interpreted as name.

The foregoing is only the preferred embodiments of the present disclosure or the description of the preferred embodiments, and is not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present disclosure shall be defined by the appended claims.

The application claims priority to the Chinese patent application No. 2018/10274393.3, filed Mar. 29, 2018, and No. 2018/10289413.4, filed Mar. 30, 2018, the disclosure of which is incorporated herein by reference as part of the application.

What is claimed is:

1. An image processing method, comprising:
acquiring a first image and a second image captured for a same object; and
determining depth information of the object in the first image or the second image according to the first image and the second image,
wherein the determining the depth information of the object in the first image or the second image according to the first image and the second image comprises:
obtaining the depth information by inputting the first image and the second image into a trained neutral network,
the neutral network includes a convolution network and a deconvolution network,
the obtaining the depth information by inputting the first image and the second image into the trained neutral network comprises:
inputting the first image and the second image into the convolution network,
taking an output of the convolution network as an input of the deconvolution network,
outputting a depth map by processing of the deconvolution network, and determining the depth information based on the depth map,
the inputting the first image and the second image into the convolution network comprises:
inputting a spliced image into the convolution network, wherein the spliced image is formed by splicing the first image and the second image on channels,
the convolution network includes n convolution layers; the deconvolution network includes n deconvolution layers; and
the taking the output of the convolution network as the input of the deconvolution network comprises:
a feature map outputted by an $i^{th}$ convolution layer in the convolution network and a feature map outputted by an $(n-i)^{th}$ deconvolution layer in the deconvolution network are spliced on channels to form a spliced feature map, the spliced feature map is taken as an input of an $(n-i+1)^{th}$ deconvolution layer among the n deconvolution layers; and i is an integer greater than or equal to 1 and less than or equal to n−1.

2. The method according to claim 1, further comprising:
processing the first image or the second image according to the depth information.

3. The method according to claim 2, wherein processing the first image or the second image according to the depth information includes:
reconstructing a three-dimensional (3D) model of the object in the first image or the second image.

4. The method according to claim 3, wherein the object is a photographing spot, a human face or a human head.

5. The method according to claim 2, wherein processing the first image or the second image according to the depth information includes:
changing light effect of the first image or the second image according to the depth information.

6. The method according to claim 2, wherein processing the first image or the second image according to the depth information includes:
beautifying the object in the first image or the second image according to the depth information.

7. The method according to claim 2, wherein processing the first image or the second image according to the depth information includes:
blurring the first image or the second image according to the depth information.

8. The method according to claim 2, wherein processing the first image or the second image according to the depth information includes:
determining whether the object is a living body according to the depth information.

9. The method according to claim 1, wherein before acquiring the first image and the second image captured for the same object, the method further comprises:
respectively obtaining the first image and the second image by preprocessing an image captured by an infrared camera and an image captured by a visible light camera.

10. The method according to claim 1, wherein the first image is an infrared image; and the second image is a black and white image, a grayscale image or a color image.

11. An image processing device, comprising:
a memory configured to store computer readable instructions; and
a processor configured to run the computer readable instructions to enable the image processing device perform:
acquiring a first image and a second image captured for a same object; and
determining depth information of the object in the first image or the second image according to the first image and the second image,
wherein the determining the depth information of the object in the first image or the second image according to the first image and the second image comprises:
obtaining the depth information by inputting the first image and the second image into a trained neutral network,
the neutral network includes a convolution network and a deconvolution network,
the obtaining the depth information by inputting the first image and the second image into the trained neutral network comprises:
inputting the first image and the second image into the convolution network,
taking an output of the convolution network as an input of the deconvolution network,
outputting a depth map by processing of the deconvolution network, and determining the depth information based on the depth map,
the inputting the first image and the second image into the convolution network comprises:
inputting a spliced image into the convolution network, wherein the spliced image is formed by splicing the first image and the second image on channels,
the convolution network includes n convolution layers; the deconvolution network includes n deconvolution layers; and
the taking the output of the convolution network as the input of the deconvolution network comprises:
a feature map outputted by an $i^{th}$ convolution layer in the convolution network and a feature map outputted by an $(n-i)^{th}$ deconvolution layer in the deconvolution network are spliced on channels to form a spliced feature map, the spliced feature map is taken as an input of an $(n-i+1)^{th}$ deconvolution layer among the n deconvolution layers; and i is an integer greater than or equal to 1 and less than or equal to n−1.

12. The image processing device according to claim 11, further comprising:
an infrared camera and a visible light camera, wherein
the processor is also configured to run the computer readable instructions to enable the image processing device further perform:
controlling the infrared camera and the visible light camera to capture images of the same object.

13. The image processing device according to claim 11, further comprising:
a device sensor configured to detect a state of the image processing device.

14. A non-transitory computer readable storage medium, used for storing computer readable instructions, when the computer readable instructions are executed by the computer, the computer performs:
acquiring a first image and a second image captured for a same object; and
determining depth information of the object in the first image or the second image according to the first image and the second image,
wherein the determining the depth information of the object in the first image or the second image according to the first image and the second image comprises:
obtaining the depth information by inputting the first image and the second image into a trained neutral network,
the neutral network includes a convolution network and a deconvolution network,
the obtaining the depth information by inputting the first image and the second image into the trained neutral network comprises:
inputting the first image and the second image into the convolution network,
taking an output of the convolution network as an input of the deconvolution network,
outputting a depth map by processing of the deconvolution network, and determining the depth information based on the depth map,
the inputting the first image and the second image into the convolution network comprises:
inputting a spliced image into the convolution network, wherein the spliced image is formed by splicing the first image and the second image on channels,
the convolution network includes n convolution layers; the deconvolution network includes n deconvolution layers; and
the taking the output of the convolution network as the input of the deconvolution network comprises:

a feature map outputted by an $i^{th}$ convolution layer in the convolution network and a feature map outputted by an $(n-i)^{th}$ deconvolution layer in the deconvolution network are spliced on channels to form a spliced feature map, the spliced feature map is taken as an input of an $(n-i+1)^{th}$ deconvolution layer among the n deconvolution layers; and i is an integer greater than or equal to 1 and less than or equal to n−1.

* * * * *